United States Patent
Kim et al.

(10) Patent No.: US 8,079,640 B2
(45) Date of Patent: Dec. 20, 2011

(54) SEAT COVER FOR VEHICLE AND SEAT HAVING THE SAME

(75) Inventors: Sang Ho Kim, Incheon (KR); Ki Jin Kwon, Gwangmyeong-si (KR); Jong Kweon Pyun, Suwon-si (KR); Jae Young Kim, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 279 days.

(21) Appl. No.: 12/482,249

(22) Filed: Jun. 10, 2009

(65) Prior Publication Data

US 2010/0140905 A1      Jun. 10, 2010

(30) Foreign Application Priority Data

Dec. 4, 2008  (KR) .................. 10-2008-0122421

(51) Int. Cl.
*A47C 31/00*      (2006.01)
(52) U.S. Cl. ................... 297/224; 297/218.1; 297/219.1
(58) Field of Classification Search ............ 297/216.13, 297/218.1, 218.2, 284.9, 219.1, 224; 280/730.1
See application file for complete search history.

(56) References Cited

U.S. PATENT DOCUMENTS

| | | | | |
|---|---|---|---|---|
| 5,938,232 | A * | 8/1999 | Kalandek et al. | 280/730.2 |
| 5,988,674 | A * | 11/1999 | Kimura et al. | 280/730.2 |
| 6,003,938 | A * | 12/1999 | Lachat et al. | 297/216.13 |
| 6,045,151 | A * | 4/2000 | Wu | 280/728.3 |
| 6,095,602 | A * | 8/2000 | Umezawa et al. | 297/216.1 |
| 6,213,550 | B1 * | 4/2001 | Yoshida et al. | 297/216.13 |
| 6,299,197 | B1 * | 10/2001 | Mueller | 280/728.3 |
| 6,357,789 | B1 * | 3/2002 | Harada et al. | 280/730.2 |
| 6,450,528 | B1 * | 9/2002 | Suezawa et al. | 280/730.2 |
| 6,588,838 | B1 * | 7/2003 | Dick et al. | 297/216.13 |
| 7,621,557 | B2 * | 11/2009 | Tracht et al. | 280/728.2 |
| 7,695,064 | B2 * | 4/2010 | Thomas et al. | 297/216.16 |
| 2005/0156412 | A1 * | 7/2005 | Panagos et al. | 280/730.2 |

* cited by examiner

*Primary Examiner* — Sarah B McPartlin
(74) *Attorney, Agent, or Firm* — Morgan, Lewis & Bockius LLP

(57) ABSTRACT

The present invention provides a seat cover for a vehicle which is configured such that when a side airbag is initially deployed, an airbag can be smoothly guided in a lateral direction. The seat cover includes a front sheet, a rear sheet and a side sheet. A reinforcing fabric is provided on an inner surface of the front sheet. The side sheet is sewn at a first edge thereof to the front sheet and sewn at a second edge thereof to the rear sheet. A reinforcing liner is adhered or welded to an inner surface of the side sheet. The reinforcing fabric is less extensible or stretchable than the reinforcing liner.

8 Claims, 4 Drawing Sheets

33,53

43

SEAT COVER FOR VEHICLE AND SEAT HAVING THE SAME

CROSS-REFERENCE TO RELATED APPLICATION

The present application claims priority to Korean Patent Application Number 10-2008-0122421 filed Dec. 4, 2008, the entire contents of which application is incorporated herein for all purpose by this reference.

BACKGROUND OF THE INVENTION

1. Field of the Invention

The present invention relates to a seat cover for a vehicle which covers a side support of a seat back having a side airbag module therein, and a seat having the seat cover.

2. Description of Related Art

Recently, the number of vehicles having side airbags has increased. Generally, such a side airbag is installed in a side support of a seat back which is adjacent to the door. When a vehicle is involved in a side collision, the airbag is deployed into a space between the door and a passenger to protect the passenger from physical force applied to the vehicle in the lateral direction.

However, because the space between the door and the passenger is typically small, if the direction in which the airbag is initially deployed is not correctly controlled, defective deployment of the airbag may incur. To avoid the defective deployment of the airbag, the air bag may be guided at the initial stage such that it is deployed in the lateral direction towards the space between the door and the passenger.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention have been developed to address the above problems occurring in the prior art, and provide for a seat cover for a vehicle which is configured such that when a side airbag is initially deployed, an airbag can be smoothly guided in a lateral direction, and a seat having the seat cover.

One aspect of the present invention is directed to a seat cover for covering a side support of a seat back for a vehicle. The seat cover may include a front sheet provided with reinforcing fabric on an inner surface thereof, a rear sheet, and/or a side sheet sewed at a first edge thereof to the front sheet and sewed at a second edge thereof to the rear sheet, with a reinforcing liner secured to an inner surface of the side sheet. The reinforcing fabric may be less extensible or stretchable than the reinforcing liner.

The reinforcing liner may be adhered or welded to the inner surface of the side sheet. The front sheet may include a first liner formed in the inner surface of the front sheet, and the first liner may be more extensible or stretchable than the reinforcing liner. The first liner may be secured to the inner surface of the front sheet by adhering or welding. The rear sheet may include a second liner formed in an inner surface of the rear sheet, and the second liner may be more extensible or stretchable than the reinforcing liner. The second liner may be secured to the inner surface of the rear sheet by adhering or welding. The extensibility or stretchability of the first liner may be equal to an extensibility or stretchability of the second liner.

Each of the reinforcing liner, the first liner and the second liner may include a fabric formed by weaving yarns of synthetic resin into a net shape, wherein yarns of the reinforcing liner may be thicker than yarns of the first or second liner, and/or a texture of the reinforcing liner may be more fine than a texture of the first or second liner. The yarns may be grey yarns.

Another aspect of the present invention is directed to a seat for a vehicle having a seat cushion and a seat back, with a side airbag module provided in a side support of the seat back that is adjacent to a door. The side support of the seat back may be covered with a seat cover, and the seat cover may include a front sheet for covering a front surface of the side support, a rear sheet for covering a rear surface of the side support, the rear sheet being more extensible or stretchable than the front sheet, and/or a side sheet for covering a side surface of the side support. The side sheet may be sewed at a first edge thereof to the front sheet and sewed at a second edge thereof to the rear sheet, and the side sheet may be more extensible or stretchable than the front sheet and being less extensible or stretchable than the rear sheet.

The front sheet may include a reinforcing fabric sewed to an inner surface of the front sheet along an outer edge thereof to reduce an extensibility or stretchability of the front sheet. The side sheet may include a reinforcing liner secured to an inner surface of the side sheet to reduce an extensibility or stretchability of the side sheet. The reinforcing liner may be adhered to the inner surface. The reinforcing liner may be welded to the inner surface.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
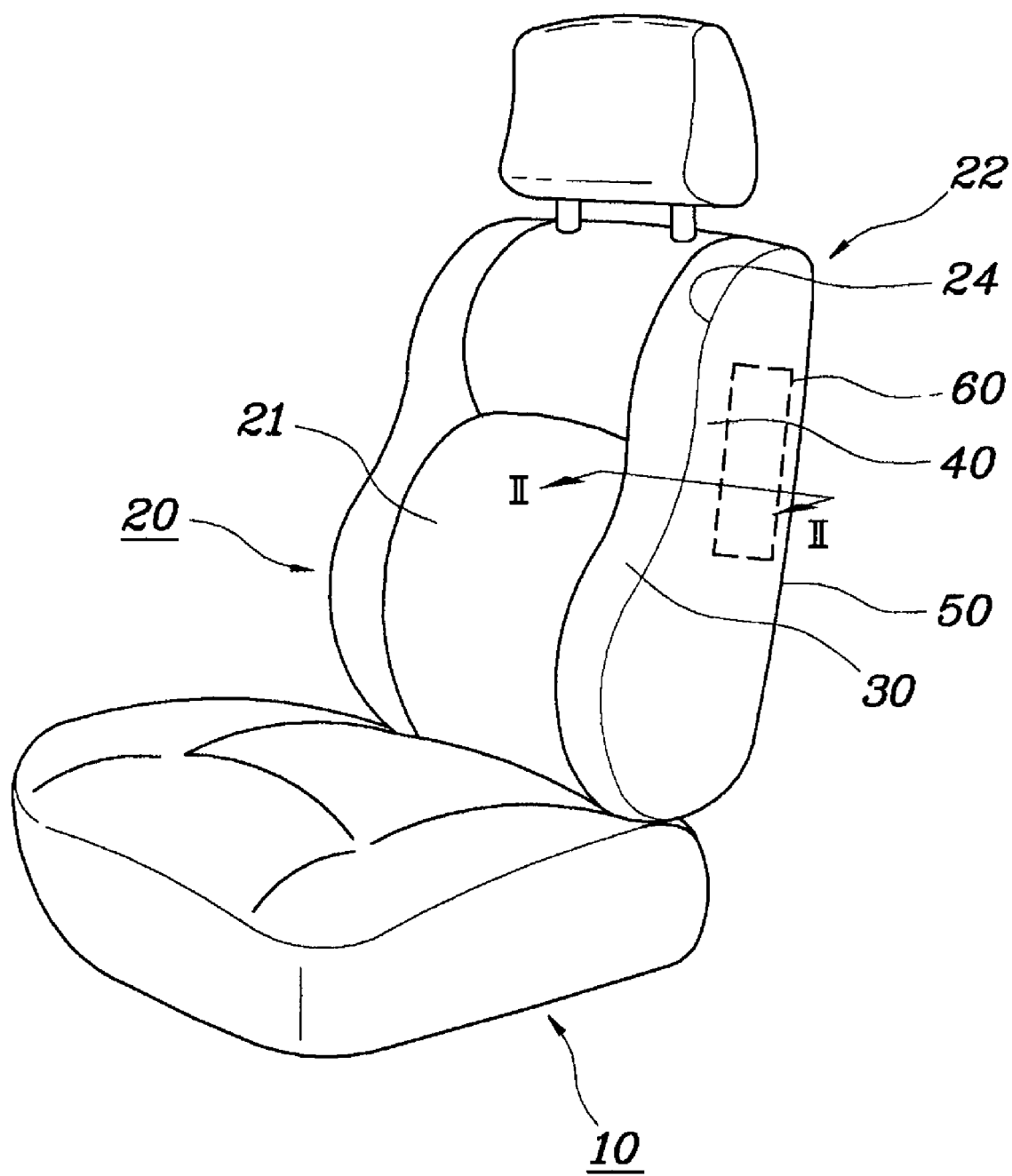
FIG. 1 is a view illustrating an exemplary vehicle seat according to the present invention.

Referring to FIG. 1, the seat according to various embodiments includes a seat cushion 10 and a seat back 20 which respectively support the hip and back of a passenger. Side supports 22 which slightly protrude forwards are respectively provided on left and right sides of the seat back 20 to support side portions of the passengers, for example, when a vehicle corners.

The seat back 20 is covered with a seat cover. The seat cover includes a front cover 21 which covers the front surface of the seat back 20, side covers 30, 40 and 50 which cover the side supports 22 of the seat back 20, and a rear cover 23 (see FIG. 2) which covers the rear surface of the seat back 20. The present invention mainly focuses on the side covers 30, 40 and 50.

Furthermore, a side airbag module 60 is installed in the side support 22 of the seat back 20 that is adjacent to the door. Each of the side covers which cover the side support 22 includes a front sheet 30 which covers the front surface of the side support 22 of the seat back 20, a side sheet 40 which covers the sidewall of the side support 22, and a rear sheet 50 which covers the rear surface of the side support 22. When the vehicle is involved in a side collision, an airbag 62 of the side airbag module 60 breaks a first sewing line formed between the front sheet 30 and the rear sheet 50 and is deployed to outside of the seat back 20.

Figure 2:
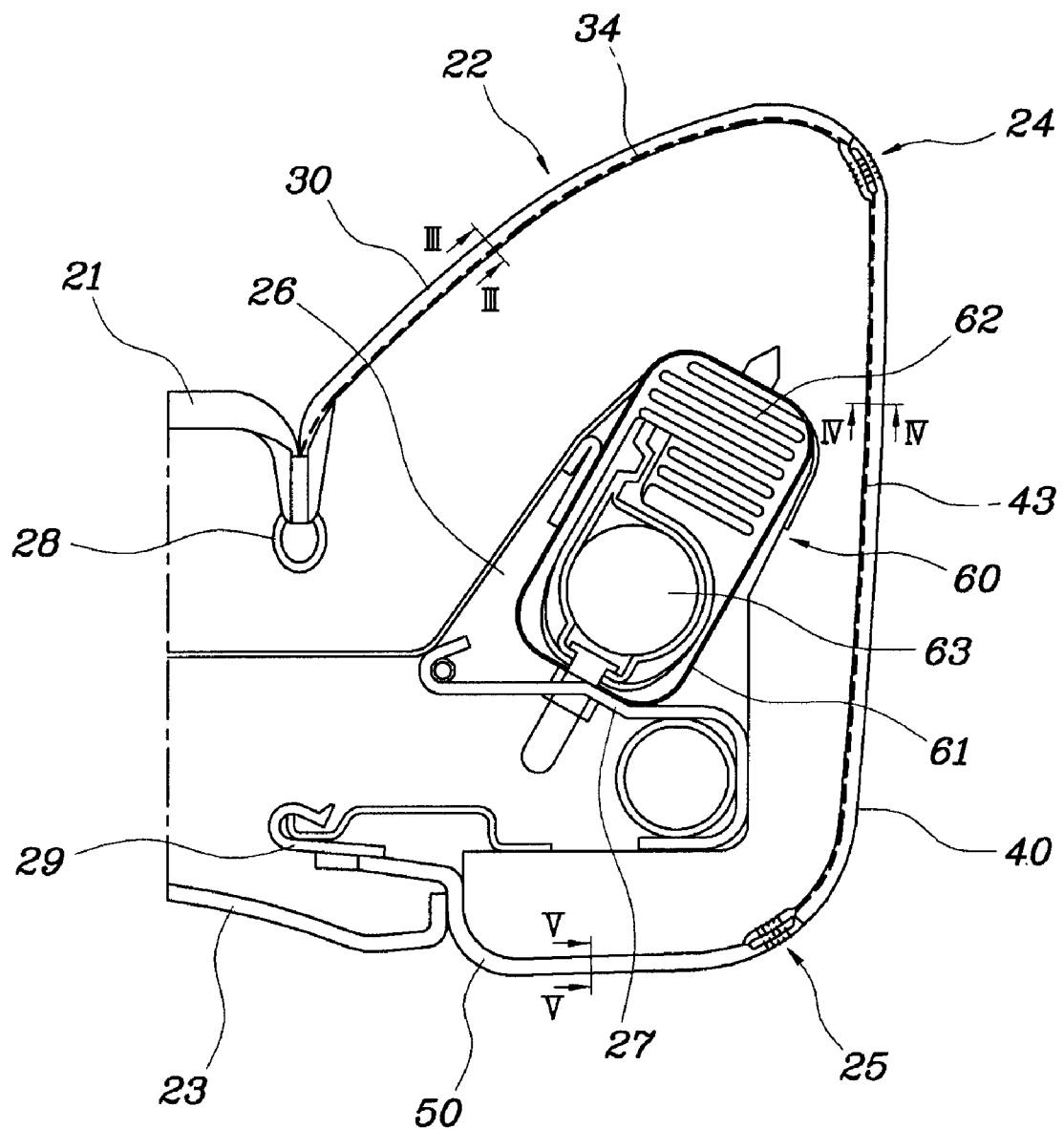
FIG. 2 is a sectional view taken along the line II-II of FIG. 1.

Referring to FIG. 2, the side airbag module 60 is installed in a cavity 26 formed in the side support 22 of the seat back. The side airbag module 60 includes a housing 61 which is fastened to a seat frame using a bracket 27, and the airbag 62 and an inflator 63 which are provided in the housing 61. When the inflator 63 is operated, the airbag 62 is extracted from the front end of the housing 61 and is inflated towards the first sewing line 24 by gas pressure supplied from the inflator 63.

The side covers 30, 40 and 50 have a structure for guiding the airbag 62 such that it is deployed in a lateral direction from the side support 22 after breaking the first sewing line 24. In detail, a reinforcing fabric 34 which has low extensibility or stretchability is provided on the inner surface of the front sheet 30. A reinforcing liner 43 which is more extensible or stretchable than the reinforcing fabric 34 is provided on the inner surface of the side sheet 40. Therefore, when the airbag 62 breaks the first sewing line 24 and is deployed outside the side support 22 of the seat back 20, the airbag 62 more strongly pushes against and opens the side sheet 40, because it is difficult for the front sheet 30 to stretch compared to the side sheet 40.

Figure 3:
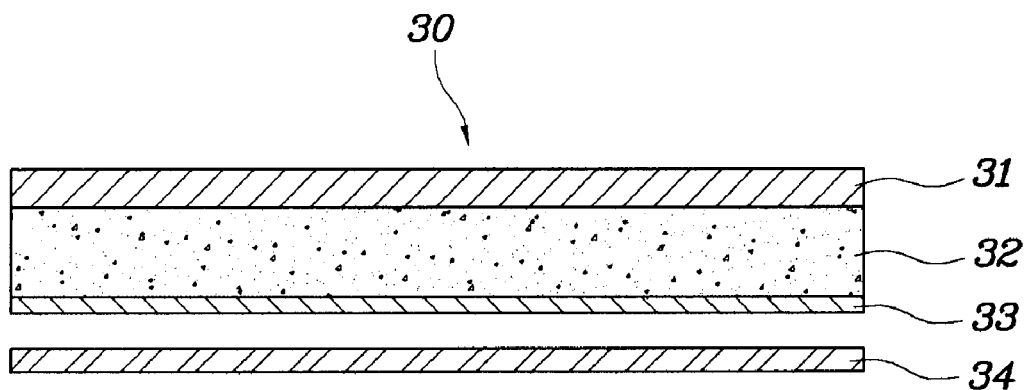
FIG. 3 is a sectional view taken along the line III-III of FIG. 2.
Figure 4:
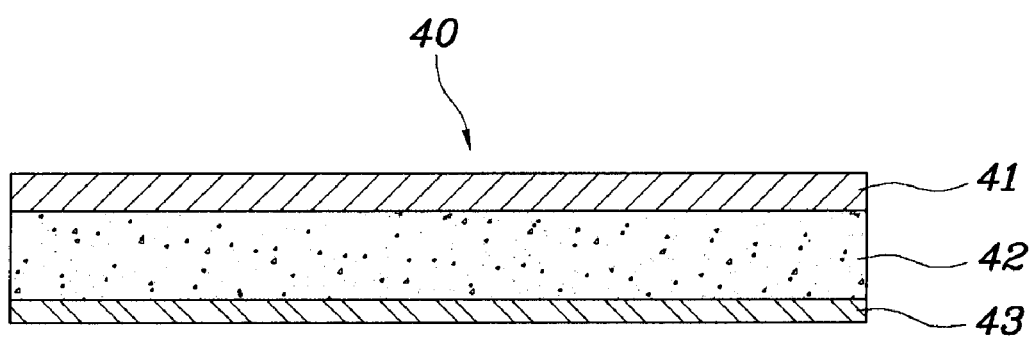
FIG. 4 is a sectional view taken along the line IV-IV of FIG. 2.

Referring to FIGS. 2 through 4, the side covers 30, 40 and 50 are noticeably characterized by the reinforcing fabric 34 having a size similar to that of the front sheet 30 and being sewed to the inner surface of the front sheet 30 along the outer edge of the front sheet 30, and the reinforcing liner 43 having a size similar to that of the side sheet 40 and being adhered or welded to the inner surface of the side sheet 40. In addition, the front sheet 30 and the side sheet 40 may be reinforced by different methods in the same manner as that of the embodiments which control the direction in which the airbag 62 is deployed, rather than reinforcing them using the same method. Here, the term 'same methods' means, for example, that a first reinforcing fabric is attached to the front sheet 30 and a second reinforcing fabric having an extensibility or stretchability higher than that of the first reinforcing fabric is attached to the side sheet 40. Depending on the case, a simple fastening unit, such as VELCRO or other suitable means, may be used to fasten the reinforcing fabric 34 to the edge of the front cover 21. Because the back of the passenger comes into close contact with the front cover 21 and because the junction between the front cover 21 and the reinforcing fabric 34 is disposed at a very tight portion, the fastening therebetween can sufficiently withstand a large force despite being of a relatively low fastening force.

Meanwhile, in Korean Patent Registration No. KR 10-0844426 B1, which was filed and registered in 2007, the assignees of the present invention noted that a structure with reinforcement provided on the front sheet 30 but not on the side sheet 40 is advantageous in that the airbag 62 can be reliably deployed in the lateral direction at the first sewing line 24. While such information noted in Korean Patent Registration No. 0844426 is still useful, it was ascertained that the side sheet 40, the inner surface of which is slightly reinforced, makes the deployment of the airbag 62 more smooth, as compared to the side sheet 40 having no reinforcement. Furthermore, from the results of tests, it was more preferable that, for reinforcement of the side sheet 40, the reinforcing liner 43 having an extensibility or stretchability higher than the reinforcing fabric 34 be directly adhered or welded to the inner surface of the side sheet 40, unlike the reinforcement of the front sheet 30.

Figure 5:
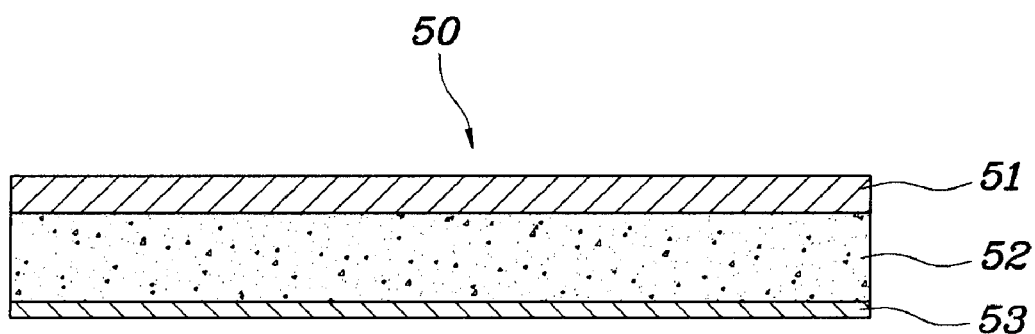
FIG. 5 is a sectional view taken along the line V-V of FIG. 2.

Referring to FIGS. 2 and 5, the rear sheet 50 is sewed to the side sheet 40 along a second sewing line 25. Unlike the front sheet 30 or the side sheet 40, the rear sheet 50 does not require reinforcing of the inner surface thereof for the purpose of reducing the extensibility or stretchability.

In terms of the productivity or ease of assembly, it may be more preferable that the side sheet 40 and the rear sheet 50 are integrated into a single body, in other words, are made of a single panel, rather than a structure in which the side sheet 40 is separated from the rear sheet 50. However, the reinforcing liner 43 which is attached to the side sheet 40 is relatively expensive. Moreover, the structure, in which the side sheet 40 is sewn to the rear sheet 50 and the side sheet 40 is reinforced while the rear sheet 50 is not reinforced, is advantageous in that the airbag 62 can be smoothly deployed. This advantage can sufficiently compensate for the difference in productivity or ease of assembly. In addition, with respect to the side sheet 40 which is bent outwards by the airbag 62 that is deploying, the rear sheet 50 functions as a hinge based on the second sewing line 25.

In FIG. 2, the reference numeral 28 denotes a member holding the front sheet 30 of the side cover and the front cover 21 together. The reference numeral 29 denotes a hook for fastening the rear sheet 50 to the seat.

The structure of the side cover will be explained in more detail with reference to FIGS. 3 through 5.

As shown in FIG. 3, the front sheet 30 has a laminated structure which includes an outer layer 31, a sponge layer 32 and a liner 33 (hereinafter, referred to as a 'first liner') in a sequence from top to bottom. The outer layer 31 may be made of fabric or artificial leather. The sponge layer 32 may be made of polyurethane. The first liner 33 is made of polyester, in detail, fabric formed by weaving grey yarns of polyester into a net.

The first liner 33 is provided for finishing and protecting the sponge layer 32 and is welded to the lower surface of the sponge layer 32 in such a way that the lower surface of the sponge layer 32 is melted by heat and the first liner 33 is attached thereto before the sponge layer 32 is hardened. The outer layer 31 is also welded to the sponge layer 32 by heat. As mentioned above, the reinforcing fabric 34 is attached on the inner surface of the front sheet 30 having the above structure. Preferably, the reinforcing fabric 34 is made of nylon fabric.

The reinforcing fabric 34 has an extensibility or stretchability lower than that of the outer layer 31, the sponge layer 32 or the first liner 33.

As shown in FIG. 4, the side sheet 40 has a laminated structure which includes an outer layer 41, a sponge layer 42 and a reinforcing liner 43 in a sequence from top to bottom. The general structure of the side sheet 40 remains the same as that of the front sheet 30 except for that the reinforcing liner 43 is more inextensible or stretchable than the first liner 33 of the front sheet 30 and the side sheet 40 has no separate reinforcing fabric. The reinforcing liner 43 has an extensibility or stretchability lower than that of the outer layer 41 or the sponge layer 42.

As shown in FIG. 5, the rear sheet 50 has a laminated structure which includes an outer layer 51, a sponge layer 52 and a liner 53 (hereinafter, refer to as a 'second liner') in a sequence from top to bottom. The general structure of the rear sheet 50 remains the same as that of the front sheet 30 except for having no reinforcing fabric. The second liner 53 has an extensibility or stretchability equal or similar to that of the first liner 33.

Figure 6A:
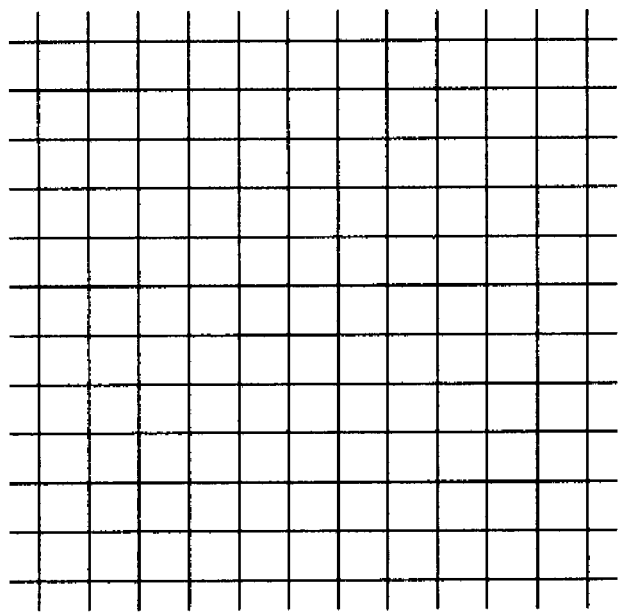
FIGS. 6A and 6B respectively are views showing the structure of a liner of FIGS. 3 and 5 and a reinforcing liner of FIG. 4.
Figure 6B:
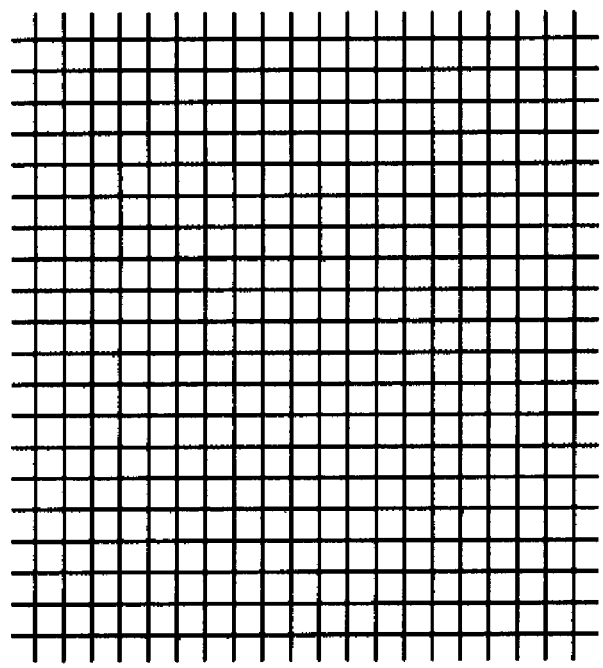

The structure of the liners 33 and 53 and the reinforcing liner 43 will be explained with reference to FIGS. 6A and 6B. As shown in FIG. 6A, each of the liners 33 and 53 and the reinforcing liner 43 comprises a fabric made by weaving grey yarns of polyester into a net shape. However, grey yarns for the reinforcing liner 43 are thicker than that of the liner 33 or 53, and the texture of the reinforcing liner 43 is more fine than that of the liner 33 or 53. For example, a grey yarn used for the liner 33 or 53 has a thickness of 15-denier, and the grey yarn used for the reinforcing liner 43 has a thickness ranging from 45-denier to 50-denier which is three to three and a half times thicker than that of the liner 33 or 53. Therefore, of course, the reinforcing liner 43 has an extensibility or stretchability lower than that of the liner 33 or 53.

As described above, in a seat cover for a vehicle according to the present invention, when a side airbag is initially inflated, it can be smoothly deployed in a lateral direction after breaking a sewing line between a front sheet and a side sheet of the seat cover.

For convenience in explanation and accurate definition in the appended claims, the terms "lower", "front" or "rear", "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat cover for covering a side support of a seat back for a vehicle, comprising:
    a front sheet provided with reinforcing fabric on an inner surface thereof;
    a rear sheet; and
    a side sheet sewed at a first edge thereof to the front sheet and sewed at a second edge thereof to the rear sheet, with a reinforcing liner secured to an inner surface of the side sheet;
    wherein the reinforcing fabric is less extensible or stretchable than the reinforcing liner; and
    wherein the front sheet includes a first liner formed in the inner surface of the front sheet, and the first liner is more extensible or stretchable than the reinforcing liner.

2. The seat cover as set forth in claim 1, wherein the reinforcing liner is adhered or welded to the inner surface of the side sheet.

3. The seat cover as set forth in claim 1, wherein the first liner is secured to the inner surface of the front sheet by adhering or welding.

4. The seat cover as set forth in claim 1, wherein the rear sheet includes a second liner formed in an inner surface of the rear sheet, and the second liner is more extensible or stretchable than the reinforcing liner.

5. The seat cover as set forth in claim 4, wherein the second liner is secured to the inner surface of the rear sheet by adhering or welding.

6. The seat cover as set forth in claim 4, wherein an extensibility or stretchability of the first liner is equal to an extensibility or stretchability of the second liner.

7. The seat cover as set forth in claim 6, wherein each of the reinforcing liner, the first liner and the second liner comprises a fabric formed by weaving yarns of synthetic resin into a net shape, wherein yarns of the reinforcing liner are thicker than yarns of the first or second liner, and a texture of the reinforcing liner is more fine than a texture of the first or second liner.

8. The seat cover as set forth in claim 7, wherein the yarns are grey yarns.

* * * * *